March 17, 1931. W. H. FLUKER 1,797,081
FASTENING MEANS FOR LICENSE PLATES AND THE LIKE
Filed Aug. 28, 1928
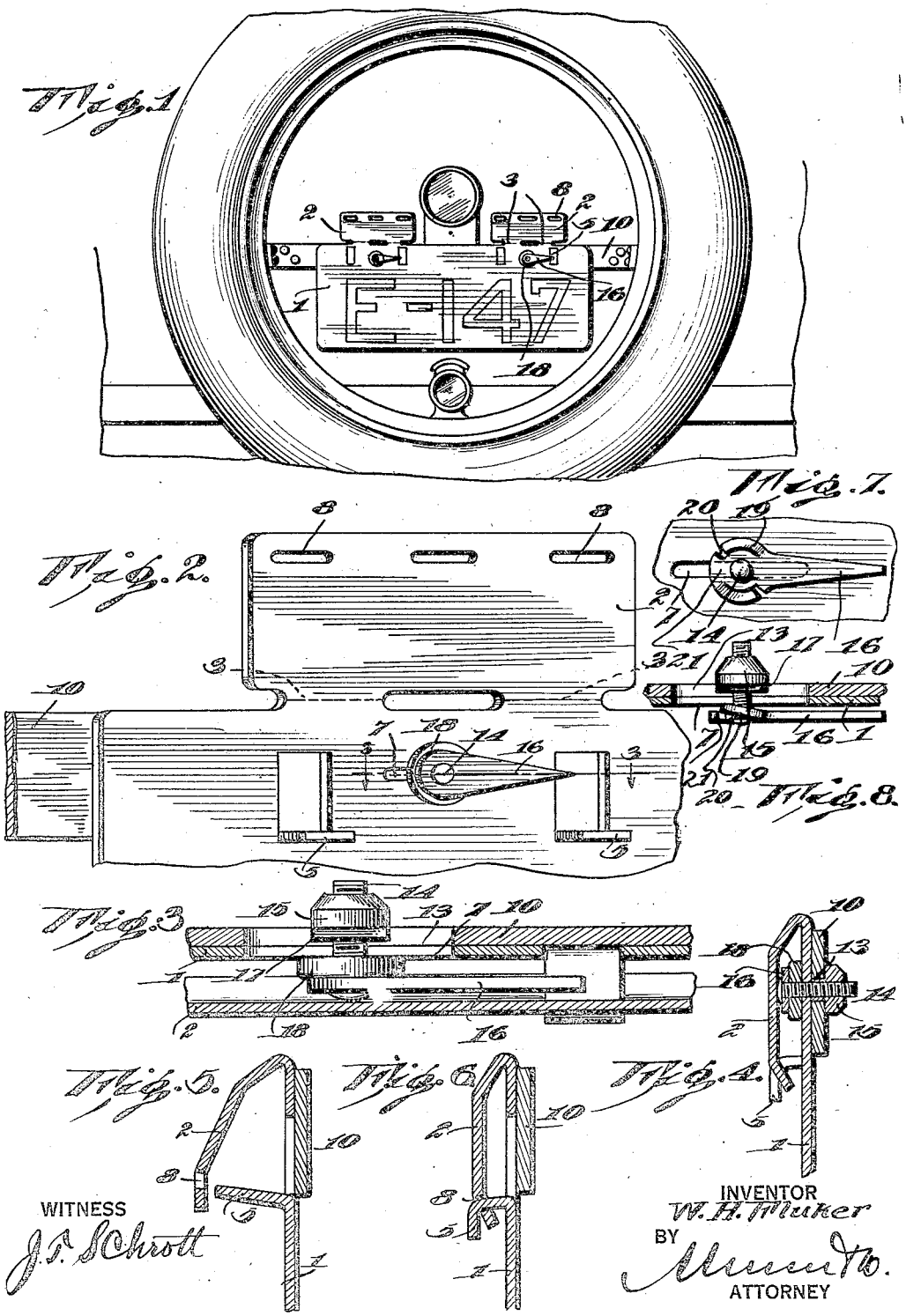
WITNESS
INVENTOR
W. H. Fluker
BY
ATTORNEY Patented Mar. 17, 1931

1,797,081

UNITED STATES PATENT OFFICE

WILLIAM H. FLUKER, OF THOMSON, GEORGIA

FASTENING MEANS FOR LICENSE PLATES AND THE LIKE

Application filed August 28, 1928. Serial No. 302,605.

This invention relates to improvements in fastening means, and it consists of the constructions, combinations and arrangements herein described and claimed.

An object of the invention to afford an improvement on Patent No. 1,655,363 granted to William H. Fluker, January 3, 1928, the specific purpose of the improvement being to utilize the sealing members of that patent as a preventative against the turning of bolts by which the license number plate is attached to a cross bar.

Another object of the invention is to so arrange the nut and bolt of the fastening means that the bolt will not have to be cut off when used in connection with the sealing member of a license number plate.

A further object of the invention is to provide a specific combination in fastening means for license plates, the combination comprising the sealing member of a license number plate and the lever of a bolt by which the plate is held in position, the arrangement being such that the bolt and lever will be held from movement when the sealing member is fixed in a sealing position.

Other objects and advantages appear in the following specification, reference being had to the accompanying drawing in which Figure 1 is an elevation of enough of the rear of an automobile to illustrate the application of the invention, the sealing members being shown in a position prior to being bent down, Figure 2 is an enlarged detail perspective view of one of the fastening means, Figure 3 is a detail section taken on the line 3—3 of Figure 2, the parts being shown as though the sealing member had been bent down into the sealing position Figure 4 is a cross section showing the sealing member in the sealing position over the lever of the bolt, Figure 5 is a detail section illustrating the first step in bending the sealing member over, Figure 6 is a detail section showing the sealing member in the final position.

Figure 7 is an elevation of a modification of the structure of the lever.

Figure 8 is a horizontal section illustrating the action of the locking tangs of the modified lever.

So much of the foregoing patent as is repeated for the purpose of this disclosure is briefly described as follows: The license number plate 1 has a pair of sealing members 2 which are made integral with the license plate at one edge. The places at which the sealing members are joined with the plate are weakened as at 3, the idea being to permit the bending down of the sealing members into a sealing position as shown in Figures 3, 4 and 6, but to result in a breaking off of the sealing members when they are bent back toward the original position.

Two forms of securing the sealing members are shown in the patent, but that form which is herein disclosed comprises tabs 5 which are stamped out of the license plate 1 as shown. Apertures 8 in the sealing member 2 (Fig. 2) will receive the tabs 5 when the former is bent down as in Figure 5 into the sealing position, whereupon the tabs will be bent downwardly as in Figure 6 to secure the sealing member.

A cross bar 10 comprises the support for the license plate and its appurtenances. The cross bar has slots 13 (Figs. 3 and 4) which are registrable with slots 7 in the license plate to permit the passage through of bolts 14. Nuts 15 are screwed upon the bolts.

The improvement comprises the affixation of a lever 16 to one end of the bolt 14. For the purposes of this description only one of the fastening means will be dealt with, it being understood that the arrangement would be identical whether two or more fastening means were used in connection with each license plate. The lever 16 occurs at the front end of the bolt, that is to say, the end next to the observer in Figure 1.

Instead of screwing the nut upon the bolt as in the patent, it is now proposed to screw the bolt into the nut. The lever will enable screwing the license plate down tight, but it serves another and more important purpose of preventing the unscrewing of the bolt from the nut when the sealing member 2 is bent over into sealing position as in Figure 4. In order that the nut will be kept from turning, it is provided with a rib 17 that fits in the slot 13 of the cross bar 10.

The rib is presented to the slot from the rear of the cross bar, and inasmuch as the slot is very narrow the rib remains in substantial concealment. Certainly it is so well protected by its confinement in the slot that it would ordinarily be impossible to insert an instrument for the defacement of the rib to such an extent that the nut could be backed off from the bolt 14 from the rear. A rubber, leather or other suitable washer 18 is fitted upon the bolt, next to the lever 16, to bear against the front of the license plate.

The operation is readily understood, and it is here that the value of the combination will become apparent. A license plate 1, made in substantial agreement with the foregoing patent, will be presented to the cross bar 10 substantially as shown in Figure 1. The ribs 17 of the nuts 15 will be fitted into the rear of the slots 13, whereupon the bolts 14 will be projected through the slots 7 and 13 from the front of the license plate and screwed into the nuts 15 until the washers 18 bind tightly against the license plate.

In so screwing the bolts 14 in, the levers 16 will be utilized in order to make a tight connection. The levers should be left in a horizontal position, or substantially so, as in Figures 1 and 2. The tabs 5 will now be pried out, it being an easy matter to move the levers 16 sufficiently far out of the way of the adjacent tab to permit bending the latter out into the substantially straight position shown in Figure 5.

Having bent the tabs out and placed the levers 16 in the substantially horizontal position the sealing members 2 will be bent down at the weakened portions 3 until the apertures come into registration with the tabs 5. The operator will now see to it that the tabs are threaded through the apertures, and having threaded them through he will bend them down into the position in Figures 4 and 6.

Now the levers are confined in an enclosure consisting mainly of the sealing members 2. It will not be possible to get at the levers 16 without bending the sealing members 2 toward the original position, and any attempt to do the latter would result in the breaking off of the sealing members, and this would be regarded as evidence that the license plate has been tampered with by an unauthorized person. The bolts 14 cannot be unscrewed from the nuts 15 unless the levers 16 can be operated, and it is thus that the sealing members 2 are utilized as means to prevent the turning of the bolts.

It sometimes occurs that the cross bar 10 will vary in thickness in different makes of cars, and with this in mind the maker of the fastening means may produce the bolts in lengths greater than necessary. In the patent it is necessary to provide bolts of almost exact length, otherwise they would have to be cut off in order to permit the bending down of the sealing members, but according to the improvement it will not be necessary to cut the bolts off because the bolts extend in the direction opposite from the sealing members, and will not conflict therewith no matter how long.

Thus the improvement presents two outstanding advantages, first the combination of the sealing member with the lever of a bolt to prevent unscrewing the bolt from its nut until the sealing member 2 is broken off after having once been bent in the sealing position, and second, the screwing of the bolt 14 into the nut 15 in the direction away from the sealing member 2 so that the bolt may be left intact and will not have to be cut off.

The foregoing description presupposes the use of a rubber, leather or other suitable washer 18, the frictional qualities of which would insure the retension of the lever 16 in a proper position regardless of the function of the sealing member 2. According to the modification in Figures 7 and 8, the washer may be dispensed with if desired, but the structure of the lever 16 is such that it will be retained in position nevertheless.

Tangs 19 are formed by cutting radial and circular kerfs 20 into the head 21 of the lever. These tangs are bent in the direction of the bolt 14 whereby they assume a position between the lever and the plate, and when the bolt is screwed into the nut 15 by means of the lever 16 (Fig. 8) the tangs will ultimately drag against the face of the license plate and establish such a locking engagement that the lever will not rattle loose under ordinary circumstances.

The exposed edges of the locking tangs will obviously be sharp, and upon an attempt to back the bolt 14 out of the nut the tangs will tend to bite into the surface of the license plate and thus tend to frustrate the attempt. It is likely that the lever will sustain some damage, and it is the intention to furnish new bolts and levers with successive issues of license plates.

It is to be understood that the use of the washer 18 or the locking tangs 19 is optional. The purpose is to provide a frictional retainer for the lever. It is desirable to hold the lever in one position, and avoid any looseness thereof behind the sealing member 2. The sealing member will prevent the counterturning of the lever and bolt so long as it remains in the sealing position, but the frictional retaining means will hold these parts stationary behind the sealing member.

While the construction and arrangement of the improved fastening means is that of a generally preferred form, obviously modifications and changes may be made without departing from the spirit of the invention or the scope of the claims.

I claim:—

1. The combination of a bolt projectible through openings in a support and a member to be mounted upon said support, a nut fixed in the opening from the outside of said support receiving the bolt which is screwed thereinto from the outside of said member, and a sealing element associated with the member to be disposed over the head of the bolt to prevent unscrewing thereof from the nut.

2. The combination of a member to be mounted upon a support, said member having a sealing element, both the member and support having registering openings, a nut having means by which it will be fixed from turning in the opening of the support, and a bolt having outstanding means to be used in screwing the bolt into the nut from the front of the member prior to disposing the sealing element in a sealing position thereover, the disposal of said element in said position obstructing said outstanding means so that the bolt cannot be turned without displacing the sealing element.

3. The combination of a plate and an associated sealing member, a bolt screwed through the plate into a support prior to bringing the sealing member into a sealing position, and means outstanding from the head of the bolt serving as a lever to turn the bolt while screwing it home and as a stop against the sealing member to prevent counter-turning of the bolt when the sealing member is brought into a sealing position over the head of the bolt.

4. The combination of a plate having an associated sealing member, a bolt by which the plate is affixed to a support, said bolt being screwed into the support from the front of the plate and away from the front of the plate so that it will not obstruct the sealing member and need not be cut off, and a lever on the front end of the bolt by which the bolt is screwed home, and which will be covered by the sealing member when in the sealing position, to prevent counter-turning of the bolt without displacing the sealing member.

5. The combination of a nut having a rib to fit in the slot of a support and prevent turning, a plate, a bolt to be screwed from the front of the plate through an opening therein and into the nut, a lever at the front of the bolt by which it is turned, frictional retainer means interposed between the lever and said plate, and a frangibly connected sealing member on the plate to be bent down over the lever to prevent access thereto for the purpose of counter-turning unless the sealing member is broken off.

6. A fastening device comprising a nut having means to engage an opening in a support and thus keep the nut from turning, a bolt to be screwed into the nut having a lever by which it is manipulated, and means which is urged tighter against a member to be secured upon the support as the lever is manipulated, constituting a frictional retainer.

7. A fastening device comprising a nut having a rib to engage an opening in a support and thus keep the nut from turning, a bolt to be screwed into the nut, and a lever carried by the bolt having a locking tang to bite into a plate to be attached to a support.

Signed at city of Washington, in the District of Columbia, this 27th day of August, A. D. 1928.

WILLIAM H. FLUKER.